(12) United States Patent
Racape et al.

(10) Patent No.: US 12,519,946 B2
(45) Date of Patent: *Jan. 6, 2026

(54) WIDE ANGLE INTRA PREDICTION AND POSITION DEPENDENT INTRA PREDICTION COMBINATION

(71) Applicant: INTERDIGITAL VC HOLDINGS, INC., Wilmington, DE (US)

(72) Inventors: Fabien Racape, San Francisco, CA (US); Gagan Rath, Rennes (FR); Edouard Francois, Bourg des Comptes (FR); Fabrice Urban, Thorigne Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,508

(22) Filed: May 24, 2024

(65) Prior Publication Data

US 2024/0314324 A1    Sep. 19, 2024

Related U.S. Application Data

(63) Continuation of application No. 17/260,378, filed as application No. PCT/US2019/037148 on Jun. 14, 2019, now Pat. No. 12,022,079.

(30) Foreign Application Priority Data

Jul. 16, 2018 (EP) .................... 18290084
Sep. 21, 2018 (EP) .................... 18306225

(51) Int. Cl.
*H04N 11/02* (2006.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
CPC .. H04N 19/132; H04N 19/105; H04N 19/159; H04N 19/176
(Continued)

(56) References Cited

U.S. PATENT DOCUMENTS 9,532,058 B2   12/2016   Chien et al.
10,404,980 B1   9/2019   Zhao et al.
(Continued)

FOREIGN PATENT DOCUMENTS

CN    105227951    1/2016
RU    2573744      1/2016
(Continued)

OTHER PUBLICATIONS

Racape et al., CE3-related: Wide-Angle Intra Prediction for Non-Square Blocks, 11. JVET Meeting; Jul. 11, 2018-Jul. 18, 2018, Ljubljana, No. JVET-K0050_r1, pp. 1-7, retrieved from the internet: URL:http://phenix.int-evry.fr/jvet/doc_end_user_/documents/11_Ljubljana/wg11/JVET-K0500-v2.zip—*—cited in parent app.
(Continued)

*Primary Examiner* — Jayanti K Patel
*Assistant Examiner* — Richard B Carter
(74) *Attorney, Agent, or Firm* — VOLPE KOENIG

(57) ABSTRACT

Methods and apparatus for performing intra prediction in an encoder or a decoder for non-square blocks enable a combination of reference samples from a row above the non-square block and a row to the left of the non-square block to be used for the prediction. In one embodiment, a weighted combination of reference samples are used. In another embodiment, the angles of prediction are extended in the
(Continued)

longer direction of the non-square block, such that less angles of prediction are used in the shorter direction.

13 Claims, 15 Drawing Sheets

(51) Int. Cl.
   *H04N 19/132* (2014.01)
   *H04N 19/159* (2014.01)
   *H04N 19/176* (2014.01)
(58) Field of Classification Search
   USPC .................................................... 375/240.02
   See application file for complete search history.

(56) References Cited

U.S. PATENT DOCUMENTS

| | | | |
|---|---|---|---|
| 11,128,872 | B2* | 9/2021 | Van der Auwera .... H04N 19/52 |
| 12,022,079 | B2* | 6/2024 | Racape ................ H04N 19/119 |
| 2013/0136175 | A1 | 5/2013 | Wang et al. |
| 2013/0163664 | A1 | 6/2013 | Guo et al. |
| 2013/0272381 | A1 | 10/2013 | Guo et al. |
| 2014/0198855 | A1 | 7/2014 | Sole et al. |
| 2016/0100191 | A1 | 4/2016 | Mishra et al. |
| 2017/0094274 | A1 | 3/2017 | Chien et al. |
| 2017/0094285 | A1 | 3/2017 | Said et al. |
| 2017/0272745 | A1 | 9/2017 | Liu et al. |
| 2017/0272759 | A1 | 9/2017 | Seregin et al. |
| 2017/0347103 | A1 | 11/2017 | Yu et al. |
| 2018/0176587 | A1 | 6/2018 | Panusopone et al. |
| 2018/0288413 | A1 | 10/2018 | Filippov et al. |
| 2019/0068976 | A1 | 2/2019 | Yamori |
| 2019/0208200 | A1 | 7/2019 | Galpin et al. |
| 2019/0356909 | A1* | 11/2019 | Lainema ................ H04N 19/91 |
| 2019/0373257 | A1* | 12/2019 | Liu ........................ H04N 19/11 |
| 2020/0322601 | A1 | 10/2020 | Ko et al. |
| 2021/0037259 | A1 | 2/2021 | Ko et al. |
| 2021/0044808 | A1 | 2/2021 | Kim et al. |

FOREIGN PATENT DOCUMENTS

| | | |
|---|---|---|
| RU | 2659733 | 7/2018 |
| WO | 2013023518 | 2/2013 |
| WO | 2018117892 | 6/2018 |
| WO | 2018117894 | 6/2018 |
| WO | 2018127624 | 7/2018 |

OTHER PUBLICATIONS

Racape et al., CE3-Related: Wide-Angle Intra Prediction for Non-Square Blocks, JVET-K0500, JVET Meeting, Jul. 11, 2018-Jul. 18, 2018; Ljubljana; (The Joint Video Exploration Team of ISO/IEC JTC1/SC29/WG11 and ITU-T SG.16), No. JVET-K0500, Jul. 16, 2018, Retrieved from the Internet: URL:http://phenix.int-evry.fr/jvet/doc_end_user/documents/11_Ljubljana/wg11/JVET-K0500-v6.zip JVET-0500_r4.docx—*—cited in parent app.
ITU-T H.265 Telecommunication Standardization Sector of ITU (Oct. 2014), Series H: Audiovisual and Multimedia Systems, Infrastructure of audiovisual services—Coding of moving video, High efficiency video coding, Recommendation ITU-T H.265—*—cited in parent app.
Lainema, et al., Intra Coding of the HEVC Standard, IEEE Transactions on Circuits and Systems for Video Technology, vol. 22, No. 12, Dec. 1, 2012, pp. 1792-1801—*—cited in parent app.
Rivaz et al., AV1 Bitstream & Decoding Process Specification, 2018, The Alliance for Open Media, pp. 1-650—*—cited in parent app.
Van Der Auwera et al, "Description of Core Experiment 3: Intra Prediction and Mode Coding", Joint Video Experts Team (JVET) of ITU-T SG 16 WP 3 and ISO/IEC JTC 1/SC 29/WG 11, Document JVET-J1023_r2, 10th Meeting: San Diego, California, USA, Apr. 10, 2018, 49 pages—* cited in parent app.
Matsuo, et al., Modification of Intra Angular Prediction in HEVC, Signal & Information Processing Association Annual Summit and Conference (APSIPA ASC), 2012 Asia-Pacific, IEEE, Dec. 3, 2012 (Dec. 3, 2012), pp. 1-4—*—cited in parent app.
Chen et al., "Further improvements to HMKTA-1.0", ITU—Telecommunications Standardization Sector, Study Group 16 Question 6, Video Coding Experts Group (VCEG), Document VCEG-AZ07_v2, 52nd Meeting: Jun. 19-26, 2015, Warsaw, Poland—*—cited in parent app.
Wang et al., Overview of the second generation AVS video Coding Standard (AVS2), ZTE Communications, vol. 14, No. 2, Feb. 2, 2016, (Feb. 2, 2016), pp. 3-11—*—cited in parent app.
Huang et al., "EE2/1: Quadtree Plus Binary Tree Structure Integration with JEM Tools", Joint Video Exploration Team (JVET) of ITU-T SG 16 WP 3 and ISO/IEC JTC 1/SC 29/WG 11, Document: JVET-C0024, 3rd Meeting, Geneva Switzerland, May 26, 2016, 5 pages—* cited in parent app.
Chen, et al., Joint inter-intra Prediction Based on Mode-Variant and Edge-Directed Weighting Approaches in Video Coding, 2014 IEEE International Conference on Acoustics, Speech and Signal Processing (ICASSP), pp. 7422-7426—*—cited in parent app.
Sjoberg et al., Description of SDR and HDR Video Coding Technology Proposal by Ericsson and Nokia, 10. JVET Meeting, Oct. 4, 2018-Apr. 20, 2018, San Diego, (The Joint Video Exploration Team of ISO/IEC JTC1/SC29/WG11 and ITU-T SG.16), URL:http://phenix.int-evry.fr/jvet, No. JVET-J0012-V2, Apr. 13, 2018—*—cited in parent app.
Racape et al., CE3-related: Wide-Angle Intra Prediction for Non-Square Blocks, 11. JVET Meeting; Jul. 11, 2018-Jul. 18, 2018, Ljubljana, No. JVET-K0500_r1, pp. 1-7—*—cited in parent app.
Van Der Auwera et al., "CE3: Simplified PDPC (Test 2.4.1)", Joint Video Experts Team (JVET) of ITU-T SG 16 WP3 and ISO/IEC JTC 1/SC 29/WG 11, Document: JVET-K0063-v2, 11th Meeting: Ljubljana, Slovenia, Jul. 10, 2018, 6 pages—*—cited in parent app.
Van Der Auwera et al., "Extension of Simplified PDPC to Diagonal Intra Modes", Document: JVET-J0069_r1, Joint Video Experts Team (JVET) of ITU-T SG 16 WP 3 and ISO/IEC JTC 1/SC 29/WG 11, pp. 1-4, 10th Meeting: San Diego, USA, Apr. 10-20, 2018—*—cited in parent app.
Keating et al., CE3-Related: Combining CE3-5.2.5 on Using Two Rows of Reference Lines for Prediction, CE3-2.4.1 on PDPC and 65 Angular Intra Modes, Joint Video Experts Teams (JVET) of ITU-T SG 16 WP 3 and ISO/IEC JTC 1/ SC 29/WG 11, 11th Meeting: Ljubljana, SI, Jul. 10-18, 2018, Document: JVET-K0377-v2—* cited in parent app.
Grange et al., VP9 Bitstream & Decoding Process Specification Version 0.6, pp. 1-171 (Mar. 31, 2016).
"Algorithm description for Versatile Video Coding and Test Model 1 (VTM 1)", Joint Video Experts Team (JVET) of ITU-T SG 16 WP 3 and ISO/IEC JTC 1/SC 29/WG 11, Document: JVET-J1002-v2, 10th Meeting: San Diego, United-States, Apr. 10, 2018, 9 pages.

* cited by examiner

WIDE ANGLE INTRA PREDICTION AND POSITION DEPENDENT INTRA PREDICTION COMBINATION

TECHNICAL FIELD

At least one of the present embodiments generally relates to a method or an apparatus for video encoding or decoding.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

Drawbacks and disadvantages of the prior art may be addressed by the general aspects described herein, which are directed to block shape adaptive intra prediction directions in encoding and decoding.

According to a first aspect, there is provided a method. The method comprises steps for predicting a sample of a non-square video block using at least one of N reference samples from a row above the non-square video block or at least one of M reference samples from a column left of the non-square video block; and, encoding the non-square video block using said prediction in an intra coding mode.

According to another aspect, there is provided another method. The method comprises steps for predicting a sample of a non-square video block using at least one of N reference samples from a row above the non-square video block or at least one of M reference samples from a column left of the non-square video block; and, decoding the non-square video block using said prediction in an intra coding mode.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a non-transitory signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a non-transitory computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
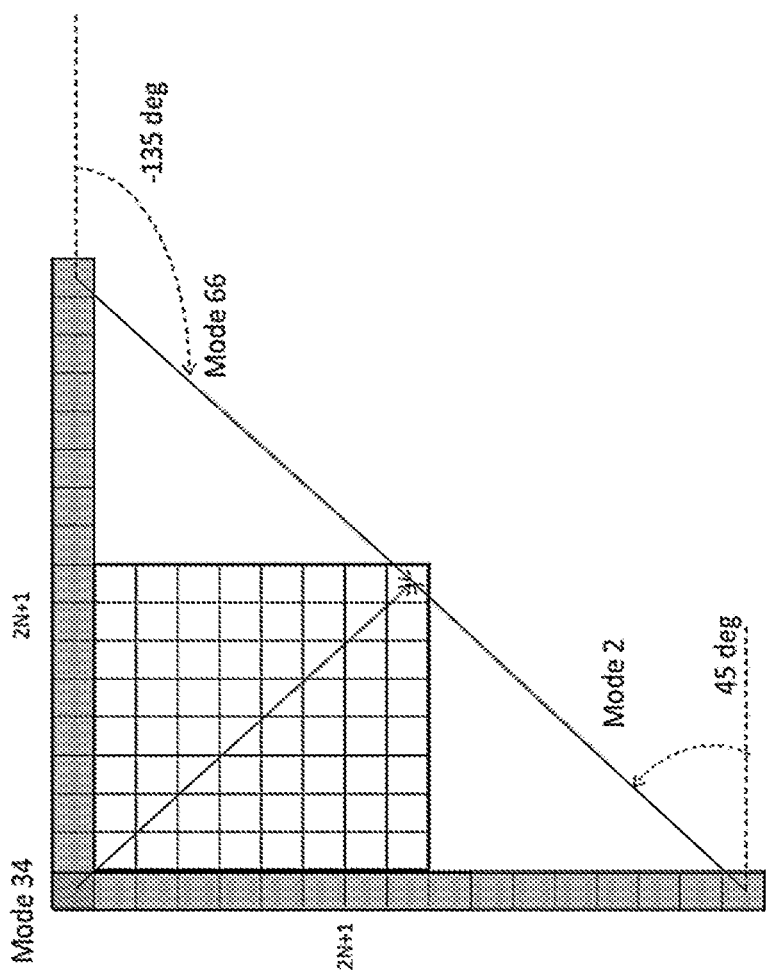
FIG. 1 shows a square block with extended reference arrays used for intra prediction.

The embodiments described here are in the field of video compression and relate to video compression and video encoding and decoding.

In the HEVC (High Efficiency Video Coding, ISO/IEC 23008-2, ITU-T H.265) video compression standard, motion compensated temporal prediction is employed to exploit the redundancy that exists between successive pictures of a video.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU).

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to −135 degree over a 180 angle, and they have been maintained in JEM, which has made the definition of angular directions independent of the target block shape.

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In a recent work, wide-angle intra prediction was proposed, which enable intra prediction direction angles higher than the conventional 45 degrees. Also, position dependent intra prediction combination (PDPC) was adopted in the current specification for the next generation of video coding H.266/VVC.

Under the embodiments described, it is proposed to solve the interactions between wide-angle modes and PDPC applied to diagonal and adjacent diagonal modes. The problem solved by the general aspects described is how to efficiently combine wide-angle intra prediction and position dependent intra prediction combination (PDPC).

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a Quad Tree (QT) where the blocks have always square shape with equal height and width. In HEVC, the angular intra prediction directions were defined from 45 degree to −135 degree over a 180 angle, and they have been maintained in JEM, which has made the definition of angular directions independent of the target block shape. However, since the idea of partitioning a Coding Tree Unit (CTU) into CUs is to capture objects or parts of objects, and the shape of a block is associated with the directionality of objects, for higher compression efficiency, it is meaningful to adapt the defined prediction directions according to the block shape. In this context, the described general aspects propose to redefine the intra prediction directions for rectangular target blocks.

The embodiments described herein aim at improving the compression performance of conventional video by improving the intra prediction with a QTBT structure. It proposes to adapt intra prediction directions according to the shape of a CU. If the shape of the CU is square, then the already-defined directions in JEM remain unchanged. Otherwise, the searched directions are modified according to the shape of the CU. However, the total number of angular directions for any CU remains unchanged. The aim of adapting the prediction directions to the block shape is to improve the prediction accuracy over the currently defined set of prediction directions, which is independent of block shape.

Furthermore, since the total number of prediction directions for a target CU remains unchanged, the encoding and decoding of the prediction mode using an MPM (Most Probable Mode) set remains unchanged. However, since CUs with different shapes have different defined direction sets, the prediction modes of the neighbor blocks are mapped to the prediction modes of the target block. The mapping is only a re-indexing of the modes, but the actual prediction directions are not changed.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples, which is required to cover the aforementioned angle range for all target pixels. Considering that the height and width of a PU are of equal length, the equality of lengths of two reference arrays also makes sense.

For the next video coding standard, JVET's attempt as Joint Exploration Model (JEM) proposes to use 65 angular intra prediction modes in addition to the planar and DC modes. However, the prediction directions are defined over the same angular range, that is, from 45 degree to −135 degree in clockwise direction. For a target block of size W×H pixels, the top reference array and the left reference array are each of size (W+H+1) pixels, which is required to cover the afore-mentioned angle range for all target pixels. This definition of the angle in JEM was done more for simplicity than for any other specific reason. However, in doing so, some inefficiency was introduced.

In JEM, it has been proposed to use a quadtree-binary tree (QTBT) block partitioning structure instead of only a quadtree structure due to higher compression performance. Unlike QT blocks, which are always of square shape, BT blocks can be rectangular with unequal width and height due to horizontal or vertical binary splitting. In the current JEM code, the aspect ratio of a rectangular block can vary from 2:1 to 8:1. So, the idea of different angular prediction modes is to capture different object directionalities, and the idea of partitioning a CTU into CUs is to capture objects or parts of objects having such directionalities. Therefore, the shape of a target block is structurally related to the directionality of the object in the block. If the shape of a block is rectangular, certain prediction directions may be more likely to occur than others, Therefore, the definition of prediction directions should not be unrelated to the target block shape, which is the case in JEM.

In the case of a square block, there is a structural symmetry. A square block is not only symmetric along both height and width but also it is symmetrically placed with respect to the two reference arrays, as seen in FIG. 1.

FIG. 1 shows a square target block with its top and left reference arrays. The target block is symmetrically placed, with respect to the two reference arrays. The prediction directions are defined from 45 deg to −135 deg in clockwise direction where mode 2 corresponds to 45 deg angle and mode 66 corresponds to −135 deg angle.

In the case of a rectangular block, this is not so with the current defined directions. When the block is flat (i.e, W>H), it is placed closer to the top reference array, but asymmetrically. Similarly, when the block is tall (i.e., W<H), it is placed closer to the left reference array, but asymmetrically. This asymmetry is shown in FIG. 2.

Figure 2:
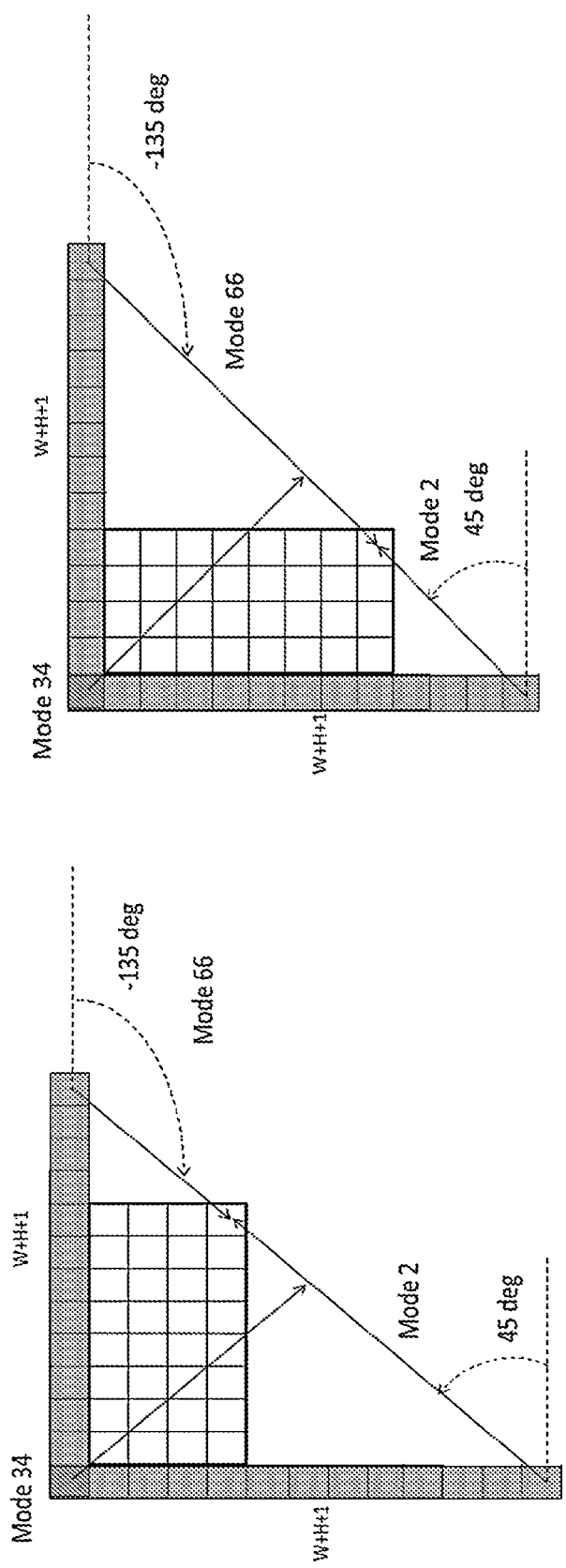
FIG. 2 shows a top and left reference arrays of lengths W+H+1.

FIG. 2 shows rectangular target blocks (flat block on the left, tall block on the right) with their top and left reference arrays. The target blocks are asymmetrically placed with respect to the two reference arrays.

The result of this asymmetry is that for some prediction modes the target pixel will be predicted from a farther reference array whereas the nearer reference array will be excluded because of the defined angles. This is shown in FIG. 3.

Figure 3:
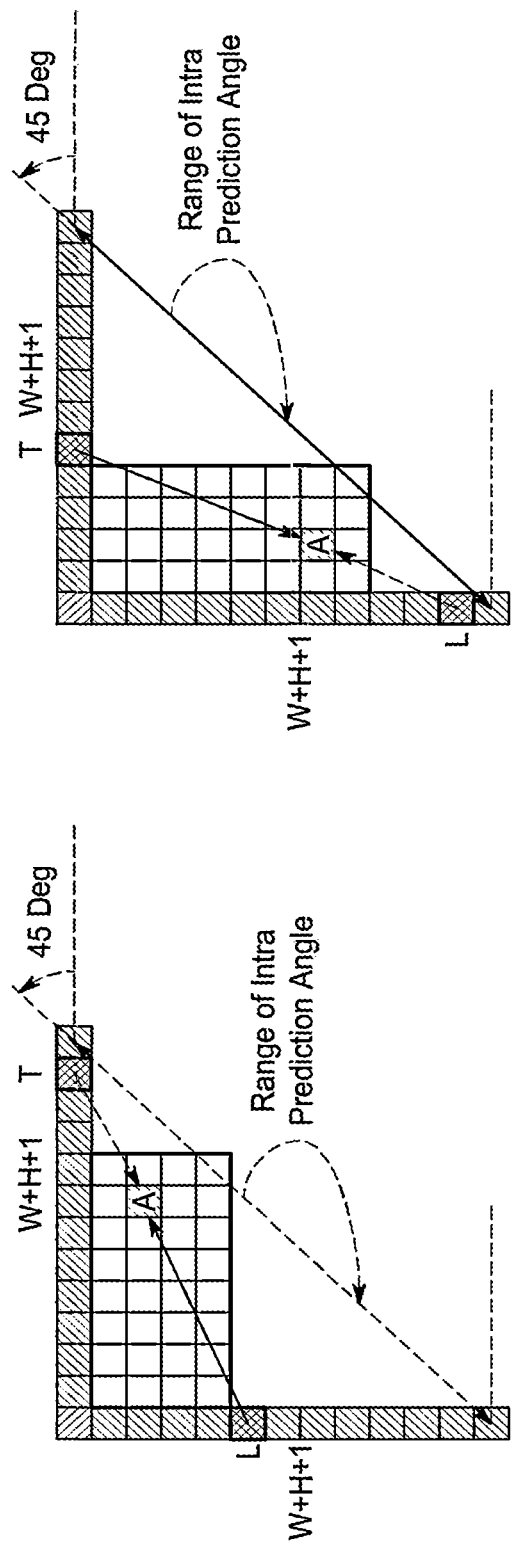
FIG. 3 shows rectangular target blocks (flat block on the left, tall block on the right) with their top and left reference arrays.

FIG. 3 shows rectangular target blocks (flat block on the left, tall block on the right) with their top and left reference arrays. On the left, the target pixel A has the predictor sample L on the left reference array with a horizontal prediction direction. Though the sample T on the top reference array is nearer, the vertical prediction direction, so that T could be the predictor sample for A, is not allowed in JEM. The right figure shows the analogous case for a target pixel in a tall block.

The flatter or taller a block is (that is, the higher the ratio of the longer side to the shorter side), this asymmetry is more pronounced. Because of the inaccuracy in prediction, such prediction modes become less likely, as seen in actual test results.

Another argument for inefficiency in current defined directions is the equality in number of prediction directions, horizontally and vertically. In JEM, excluding the diagonal mode (mode 34), there are 32 modes in both horizontal and vertical directions. For a square CU, both the height and width being equal, it makes sense to have same number of prediction modes along both horizontal and vertical directions. When the block is rectangular with one side longer than the other, the number of prediction directions in the longer side should be higher simply because of the possibility of higher number of structural directionalities in that side. For a flat block, the ratio of vertical to horizontal mode numbers should be of the order of the ratio of the width to height. Similarly, for a tall block, the ratio of horizontal to vertical mode numbers should be of the order of the ratio of the height to width. A related point to consider is the length of the reference arrays. For a square CU, both height and width being equal, it makes sense to have a same length for the reference arrays. However, for rectangular blocks, intuitively, if the width is greater than height, the top reference array should have more samples than the left one.

Similarly, for blocks with height greater than width, the left reference array should have more samples than the top one. This intuition is based on the fact that a flat (tall) rectangular block has more samples or information along the horizontal (vertical) direction. Likewise, a tall rectangular block has more samples or information along the vertical direction. Therefore, the currently defined directions from 45 deg to −135 degree, which result in equal number of prediction modes in both horizontal and vertical directions, as well as equal lengths of reference arrays, are somewhat inefficient for rectangular blocks.

Figure 7:
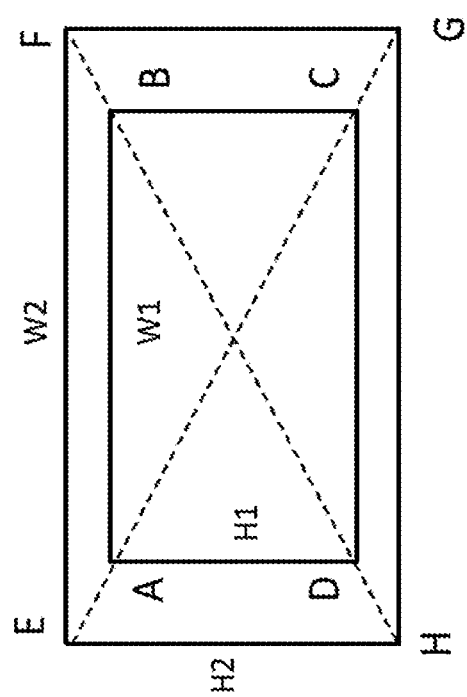
FIG. 7 shows an example of two rectangles having similar aspect ratios but equal angles from center to corners.

In JEM, BT (binary tree) target blocks can have different shapes depending on the lengths of their widths and heights. A rectangle is defined by its width W, and height H, as shown in FIG. 7. If A, B, C, and D denote its four vertices, as shown in the figure, then AC is its principal diagonal and BD is its secondary diagonal. A square is a special rectangle when W=H. FIG. 7 shows attributes of a rectangular block.

Figure 5:
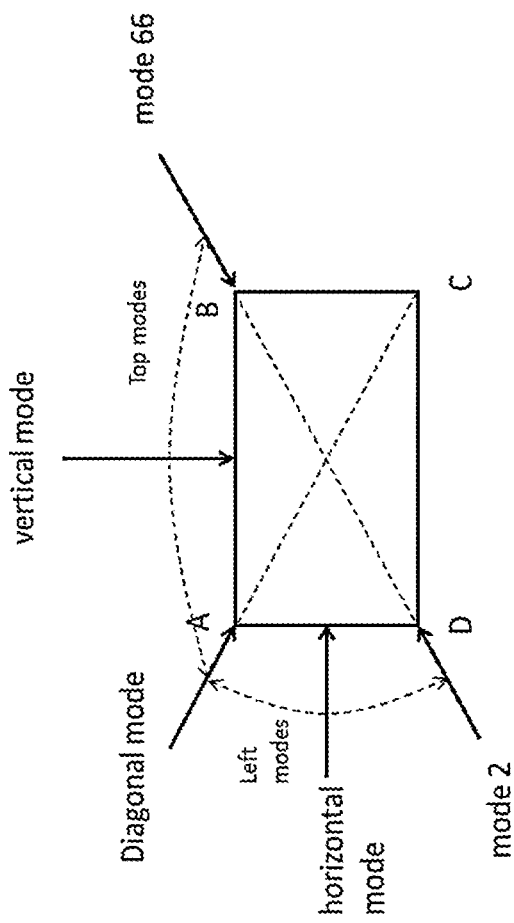
FIG. 5 shows a rectangular block and the definitions of various intra prediction modes.

For any target block of width W and height H, mode 2 will be associated with the direction from vertex D towards vertex B, mode 66 with the direction from vertex B towards vertex D, along the secondary diagonal, as shown in FIG. 5. The diagonal mode is associated with the direction from vertex A towards vertex C along the principal diagonal. All modes from mode 2 up to the diagonal mode will be termed Left modes. Similarly, all modes from the diagonal mode to mode 66, including the diagonal mode, will be termed Top modes. Left modes are associated with horizontal directions. Similarly, Top modes are associated with vertical directions. The horizontal mode, or purely horizontal mode, is a Left mode that corresponds to the zero-degree angle. The vertical mode, or purely vertical mode, is a Top mode that corresponds to a −90-degree angle.

FIG. 5 shows a definition of prediction directions for a rectangular block. Mode 2 is along the secondary diagonal from vertex D towards vertex B. Mode 66 is along the opposite direction to mode 2. Diagonal mode is along the principal diagonal from vertex A towards vertex C.

Figure 6:
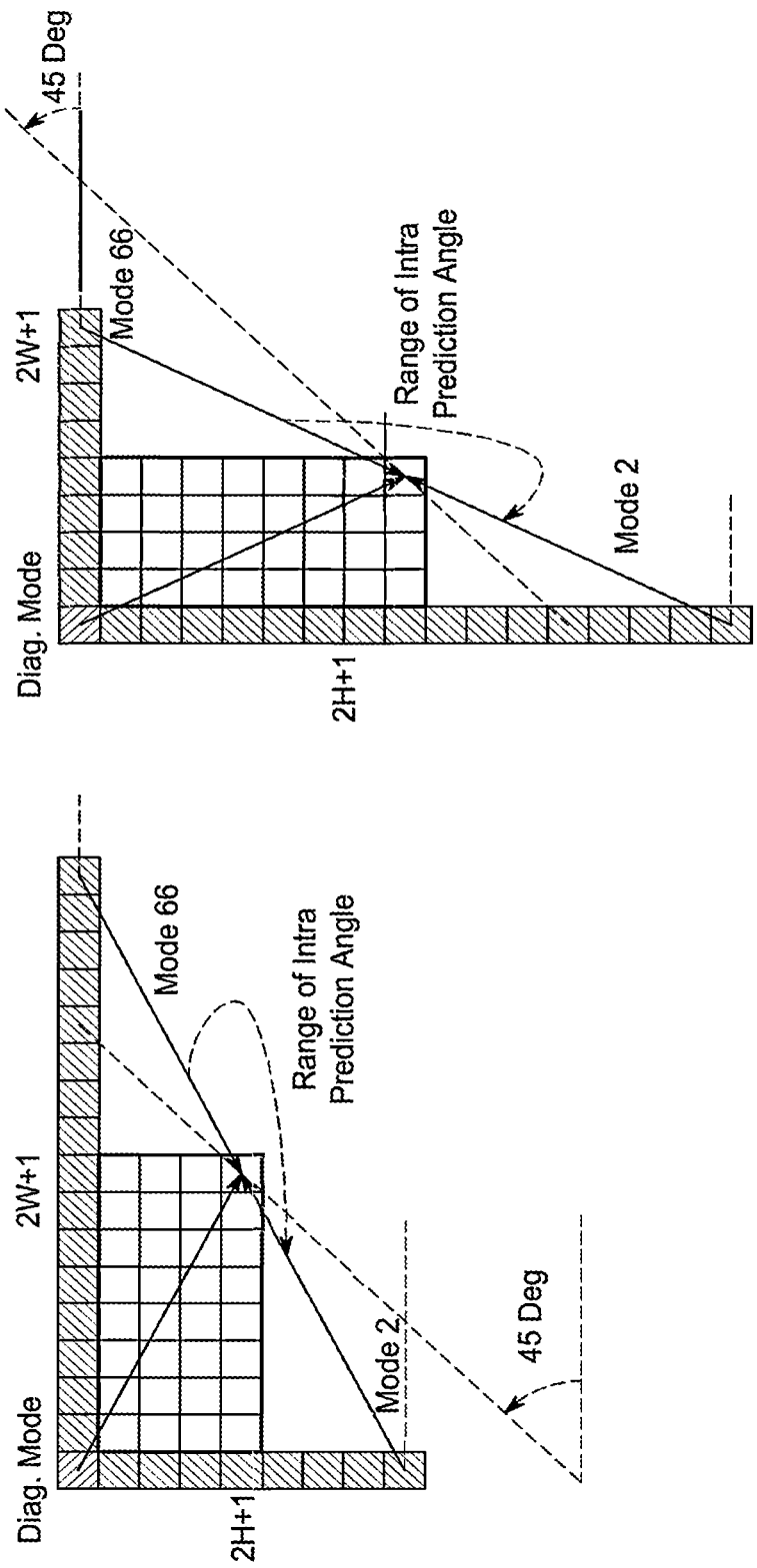
FIG. 6 shows a top reference array has length 2W+1, and left reference array has length 2H+1.

FIG. 6 shows a top reference array has length 2W+1, left reference array has length 2H+1. The width W and the height H are the dimensions of the white blocks in FIG. 6.

To support these prediction directions, the top reference with length 2W+1, and the left reference with length 2H+1, are defined as shown in FIG. 6. In the case of a square block, the figure will be identical to that in FIG. 1, where W=H=N.

Notice that, for a flat block, the length of the top reference is larger than that of the left reference array. So are the number of Top modes compared to the Left modes. Similarly, for a tall block, the converse is true. The length of the left reference is larger than that of the top reference array in that case.

Moreover, the location of the block is symmetric with respect to the reference arrays. When the target block is a square, there is perfect symmetry, and the prediction directions and the lengths of reference arrays match the JEM definitions exactly, as in FIG. 1.

The advantage of the above definition is the adaptivity of the prediction directions with the block shape. Notice that, here, the modes 2 and 66 are not defined to correspond to directions along a 45-degree angle and a −135-degree angle, rather the directions along the secondary diagonal. In the case of a flat block, some directions near, and including, 45-degree are removed, but an equal number of directions are added exactly in the opposite directions beyond −135-degree angle. Similarly, in the case of a tall block, some directions near, and including, a −135-degree are removed, but an equal number of directions are added exactly in the opposite directions beyond a 45-degree angle. We will refer to the offset of the mode 2 from 45-degree angle as "modeShift", which is defined as the number of modes removed (between mode 2 and 45-degree angle), or equivalently, the number of modes added (between angle −135-degrees and mode 66). Flat blocks have a positive modeShift whereas tall blocks will have a negative modeShift. For a square block, the modeShift is equal to 0.

The modeShift of a block represents the offset of its starting mode (that is Mode 2) with respect to the starting mode of a square block. Clearly, it is a function of the shape of the block. The important observation to make is that the modeShift of a block does not depend on the absolute values of its width and height, but rather depends on their ratio. This is illustrated in FIG. 7. Rectangle ABCD (width W1 and height H1) and rectangle EFGH (width W2 and height H2) have the same prediction directions (hence, the same modeShift). Using the similarity of triangles, it can be shown that W1/W2=H1/H2. Therefore W1/H1=W2/H2. Therefore, the blocks having the same ratio of width-to-height (or vice versa) will have the same prediction modes in both horizontal and vertical directions.

FIG. 7 shows blocks having the same aspect ratio (the ratio of width-to-height) have same prediction directions and hence the same modeShift.

Wide-angle intra prediction aims at defining a better set of intra prediction directions when the block is rectangle.

In the case of non-square block, for some prediction modes, the target pixel will be predicted from a farther reference array, whereas the nearer reference array will be excluded because of the defined angles. This is shown in FIG. 3.

FIG. 3 depicts rectangular target blocks (flat block on the left, tall block on the right) with their top and left reference arrays. On the left, the target pixel A has the predictor sample L on the left reference array with a horizontal prediction direction; Though the sample T on the top reference array is nearer, the vertical prediction direction, so that T could be the predictor sample for A, is not allowed in VTM/BMS. The right figure shows the analogous case for a target pixel in a tall block.

For non-square blocks, it is proposed to replace several conventional angular intra prediction modes with wide angle directional modes. The replaced modes are signaled using the original method and remapped to the indexes of wide angular modes after parsing. The total number of intra prediction modes is unchanged, and the intra mode coding is unchanged.

To support these prediction directions, it is proposed to define the top reference with length 2W+1, and the left reference with length 2H+1.

FIG. 6 depicts top reference array has length 2W+1, left reference array has length 2H+1. In the case of a square block, the directions and the lengths of the reference arrays are identical to those in VTM/BMS.

Figure 8:
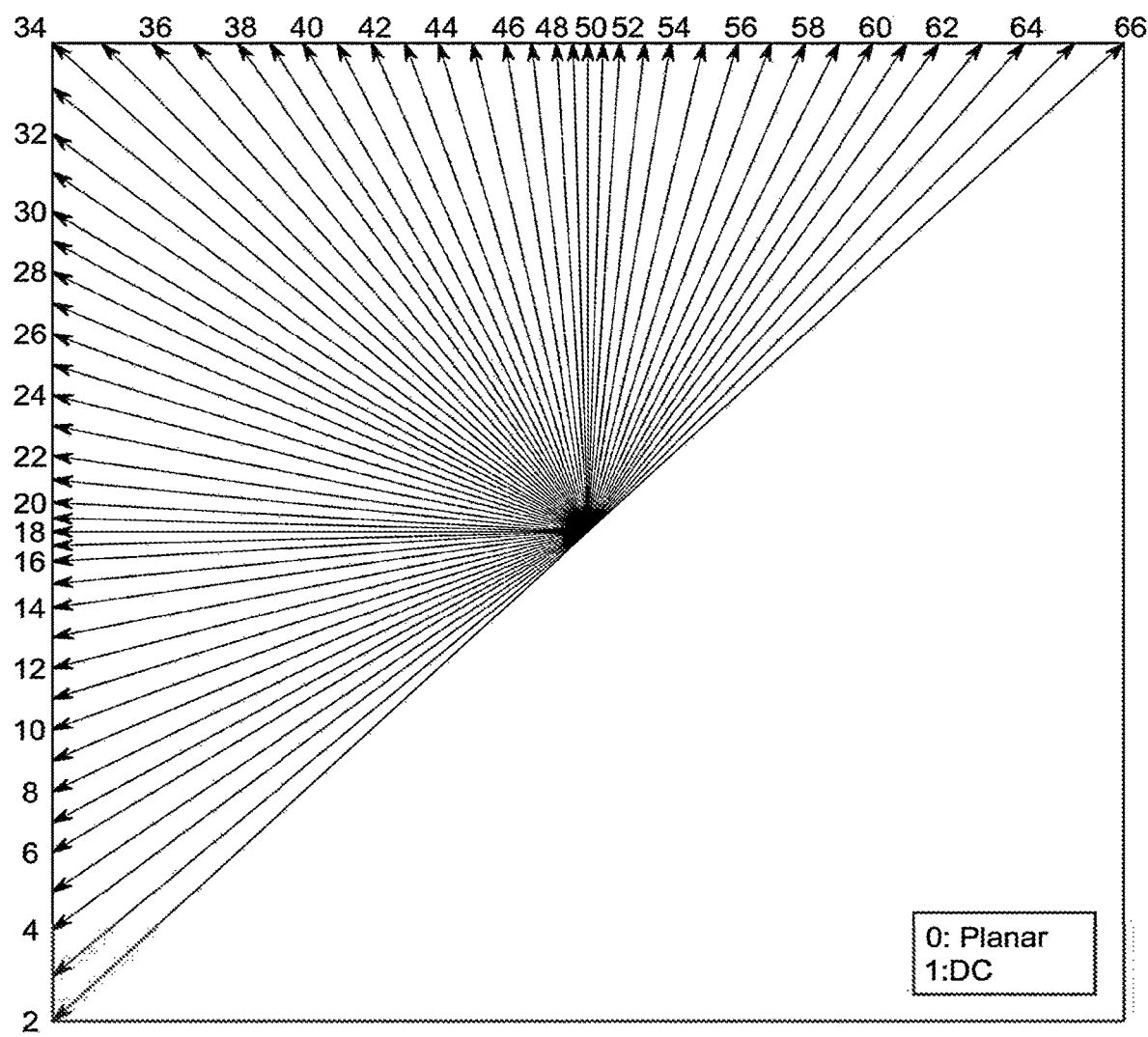
FIG. 8 shows an example of intra directional modes applicable to the general aspects described.

FIG. 8 shows the intra prediction directions when 65 intra directional modes are used. Diagonal modes correspond to mode #2 (−135 degrees) and mode #66 (45 degrees). Embodiments described herein also apply to this case, even though some examples are shown with 35 intra directional modes.

Figure 9:
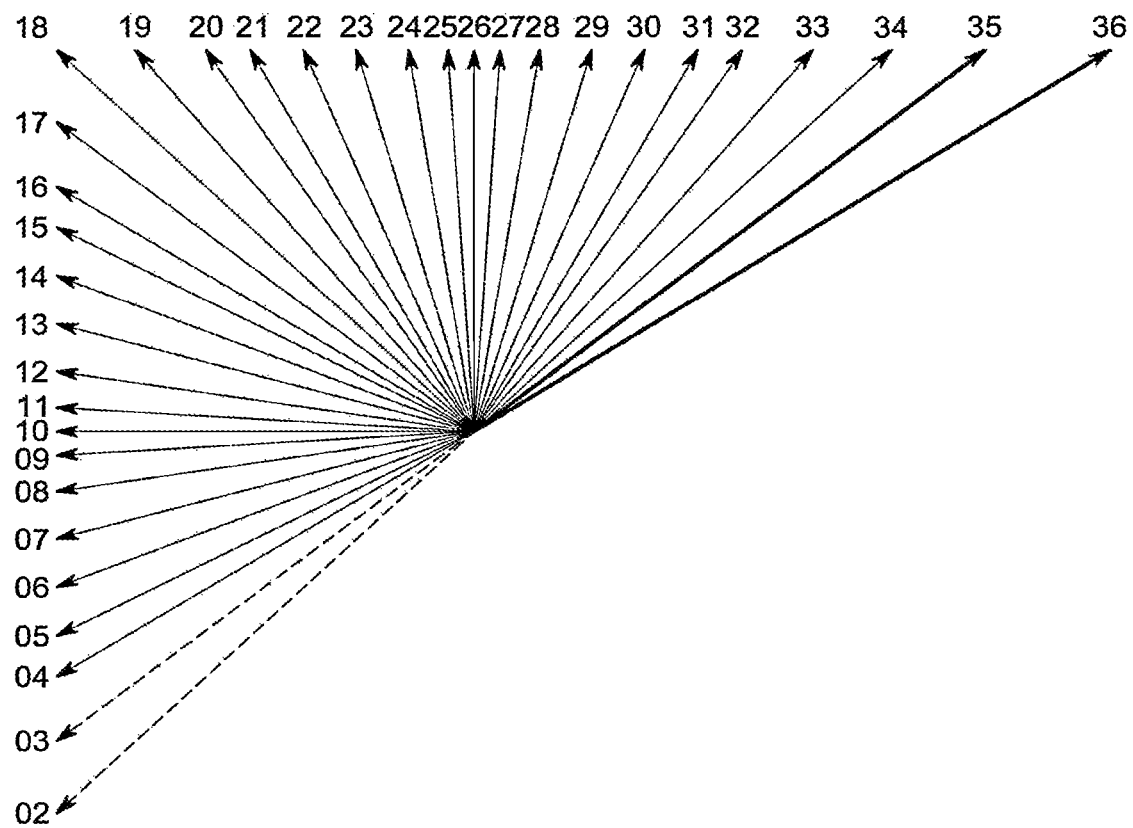
FIG. 9 shows another example of intra directional modes applicable to the general aspects described.

FIG. 9 shows an example of how angular intra modes are replaced with wide angular modes for non-square blocks in the case of 35 intra directional modes. In this example, mode 2 and mode 3 are replaced with wide angle mode 35 and mode 36, where the direction of mode 35 is pointing to the opposite direction of mode 3, and the direction of mode 36 is pointing to the opposite direction of mode 4.

FIG. 9 shows replacing intra directions in the case of a flat rectangle (width>height). In this example, 2 modes (#2 and #3) are replaced by wide angle modes (35 and 36).

For the case of 65 intra directional modes of FIG. 8, wide angle intra prediction can transfer up to 10 modes. If a block has greater width than height, for example, modes #2 to mode #11 are removed and modes #67 to #76 are added under the general embodiments described herein.

PDPC, as currently adopted in the draft for a future standard H.266/VVC, applies to several intra modes: planar, DC, horizontal, vertical, diagonal modes and so called adjacent diagonal modes, i.e. close directions to the diagonals. In the example of FIG. 3, diagonal modes correspond to mode 2 and 34. Adjacent modes can include for instance modes 3, 4, 32, 33 if two adjacent modes are added per diagonal direction. In the current design of the adopted PDPC, 8 modes are considered per diagonal, i.e. 16 adjacent diagonal mode in total. PDPC for diagonal and adjacent diagonal modes is detailed below.

FIG. 4(a) illustrates the definition of reference samples $R_{x,-1}$, $R_{-1,y}$ and $R_{-1,-1}$ for the extension of PDPC to the top-right diagonal mode. The prediction sample pred(x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

The PDPC weights for the top-right diagonal mode are:

$$wT = 16 \gg ((y' \ll 1) \gg \text{shift}), wL = 16 \gg ((x' \ll 1) \gg \text{shift}), wTL = 0.$$

Figure 4:
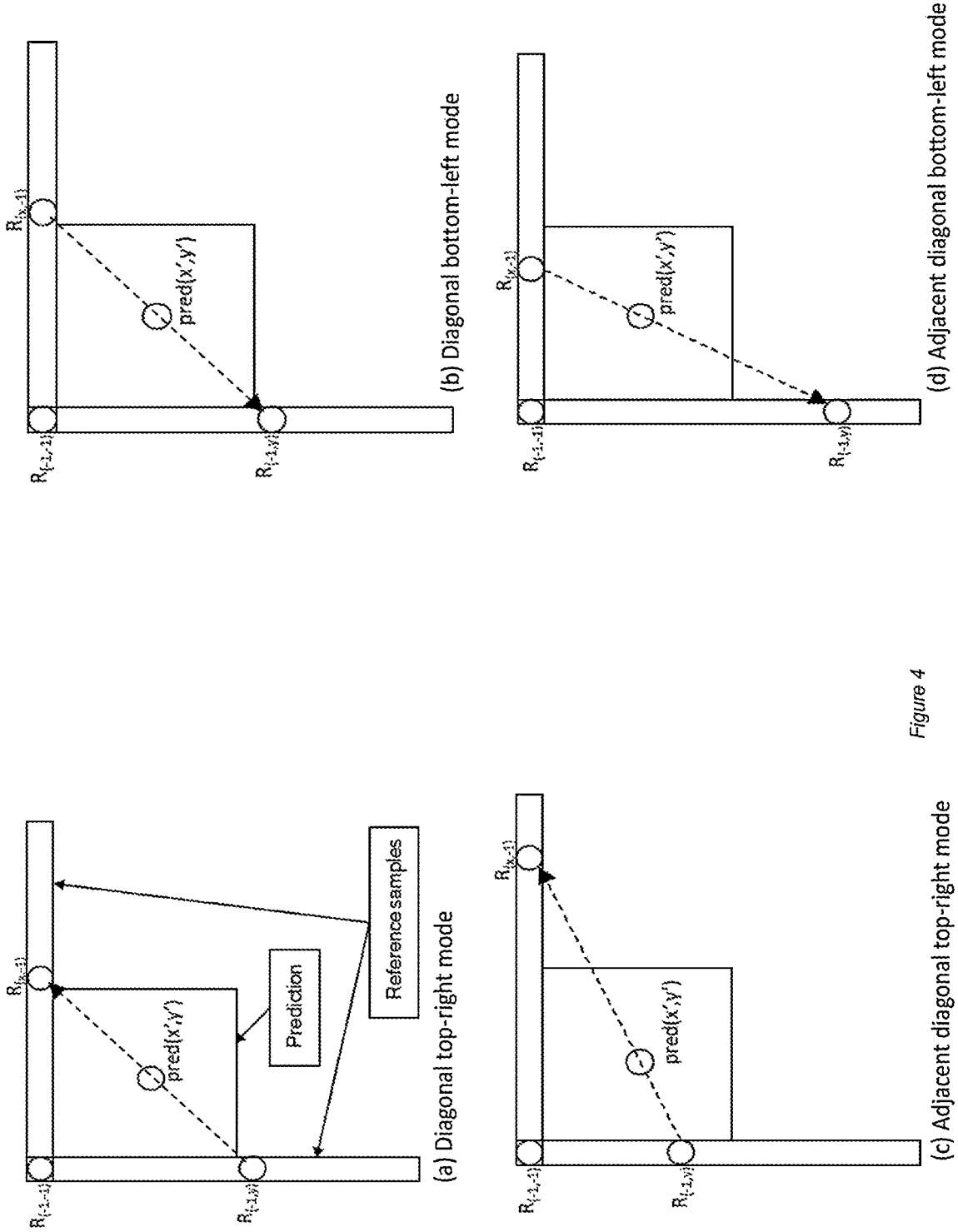
FIG. 4 shows definitions of samples used by PDPC extension to diagonal and adjacent angular intra modes.

FIG. 4 shows definition of samples used by PDPC extension to diagonal and adjacent angular intra modes.

Similarly, FIG. 4(b) illustrates the definition of reference samples $R_{x,-1}$, $R_{-1,y}$ and $R_{-1,-1}$ for the extension of PDPC to the bottom-left diagonal mode. The coordinate x of the reference sample $R_{x,-1}$ is given by: x=x'+y'+1, and the coordinate y of the reference sample $R_{-1,y}$ is: y=x'+y'+1. The PDPC weights for the top-right diagonal mode are: wT=16>>((y'<<1)>>shift), wL=16>>((x'<<1)>>shift), wTL=0. The case of an adjacent top-right diagonal mode is illustrated in FIG. 4(c). The PDPC weights for an adjacent top-right diagonal mode are: wT=32>>((y'<<1)>>shift), wL=0, wTL=0. Similarly, the case of an adjacent bottom-left diagonal mode is illustrated in FIG. 4(d). The PDPC weights for an adjacent bottom-left diagonal mode are: wL=32>>((x'<<1)>>shift), wT=0, wTL=0. The reference sample coordinates for the last two cases are computed using the tables that are already used for angular mode intra prediction. Linear interpolation of the reference samples is used if fractional reference sample coordinates are calculated.

There exist interactions with wide-angle intra prediction in the case of diagonal modes and adjacent diagonal modes.

First, in the current JEM design, the available reference samples, for any block, are located in a top line segment and a left line segment of size width+height+1, as depicted in FIG. 1. In the case of diagonal angle, PDPC can be applied to any pixel in the block since both R(x,−1) and R(−1,y) are always available. That is not the case for adjacent diagonal angles for which the line passing by bottom right pixels of the block may not cross available sample segments. In that case, PDPC is partially applied over the block, which requires pixel-wise testing of the reference sample availability. This can be considered as an issue regarding implementation complexity.

Some embodiments of the general aspects described also aim to solve this issue.

In the embodiments described, it is proposed to modify the set of modes for which PDPC is applied in the case of non-square blocks.

In the current JEM design, the set of adjacent modes does not include the extended modes. For example, in FIG. 3, modes #35 and #36 cannot benefit from PDPC.

It is proposed to extend the adjacent diagonal modes to the added wide-angle modes.

Variant 1:

PDPC is applied to all wide-angle modes in addition to diagonal and adjacent diagonal modes.

Variant 2:

PDPC is applied to as many adjacent modes from each side of diagonal modes.

Variant 3:

As adjacent modes raise the issue of applying PDPC partially over the block, since reference samples are not always available, it is proposed not to apply PDPC to existing adjacent modes, e.g. mode 33 in FIG. 3 but to extended directions since reference sample are available on both sides for these directions.

Variant 4:

In case of a non-square block, do not consider the diagonal mode as 45-degree or −135-degree, as it is currently the case, but consider the last extended wide direction as diagonal, and adjacent angles to this new direction as adjacent diagonal modes for PDPC.

As described in FIG. 4, PDPC in the case of adjacent diagonal modes, requires the availability of both top and left reference samples.

Wide angle intra prediction, as presented in JVET-K0500, modifies the size of reference sample buffer from width+height+1 for both left and top lines to 2*height+1, resp. 2*height+1, for the left, resp. right reference buffer. This modifies the available samples for PDPC.

Variant 5:

It is proposed not to reduce the size of the reference sample buffer related to the smallest side. For example, for a flat block as in FIG. 2 (left side) use width+height+1 samples instead of 2*height+1. This solves the case of diagonal PDPC, which can be applied all over the block in the current design but cannot be applied to some bottom right samples of the current block if the size is changed to 2*height+1. In that case, all the wide-angle modes can also fully benefit from PDPC, i.e. all the samples of the block can be processed.

Variant 6:

In case the size of reference buffer is not extended, do not constraint the use of PDPC when there is no reference sample available and take the value of the last reference sample in the line.

Figure 10:
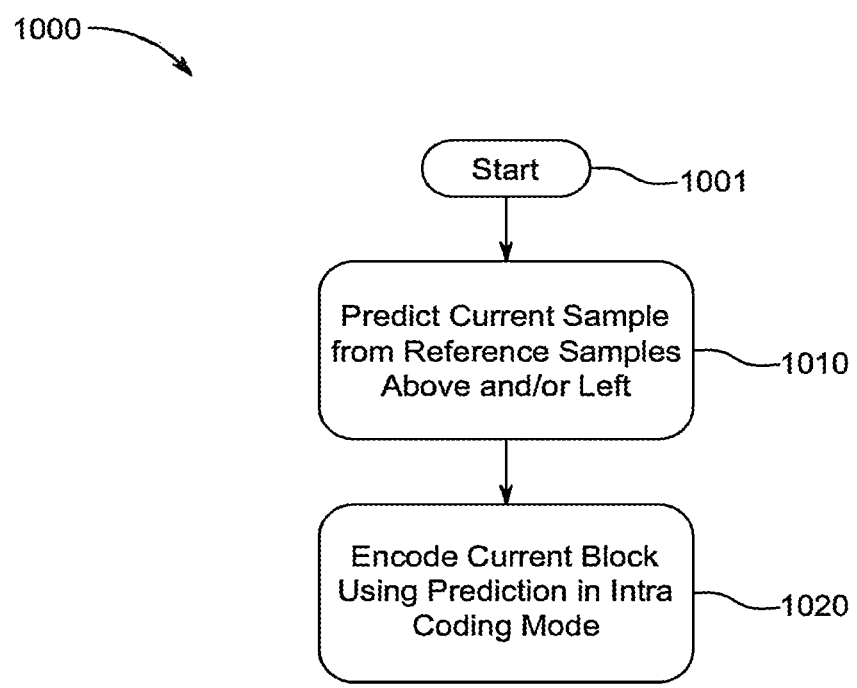
FIG. 10 shows an embodiment of a method for encoding using in-loop filtering with multiple regions.

One embodiment of a method 1000 for encoding a block of video data using the general aspects described here is shown in FIG. 10. The method commences at Start block 1001 and control proceeds to function block 1010 for predicting a sample of a non-square video block using at least one of N reference samples from a row above the non-square video block or at least one of M reference samples from a column left of the non-square video block. Control then proceeds from block 1010 to block 1020 for encoding the non-square video block using said prediction in an intra coding mode.

Figure 11:
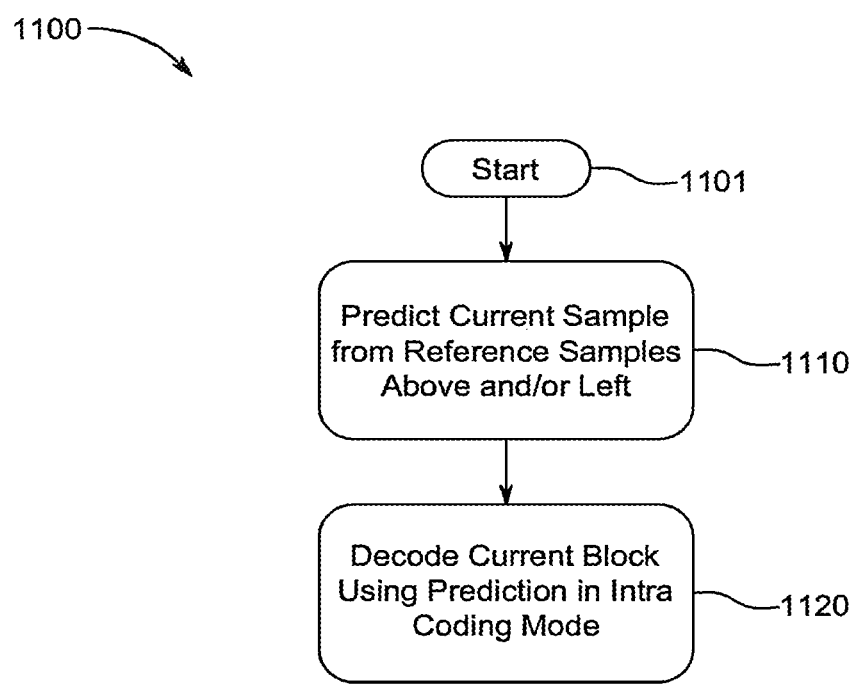
FIG. 11 shows an embodiment of another method for decoding using in-loop filtering with multiple regions.

One embodiment of a method 1100 for decoding a block of video data using the general aspects described here is shown in FIG. 11. The method commences at Start block 1101 and control proceeds to function block 1110 for predicting a sample of a non-square video block using at least one of N reference samples from a row above the non-square video block or at least one of M reference samples from a column left of the non-square video block. Control then proceeds from block 1110 to block 1120 for decoding the non-square video block using said prediction in an intra coding mode.

Figure 12:
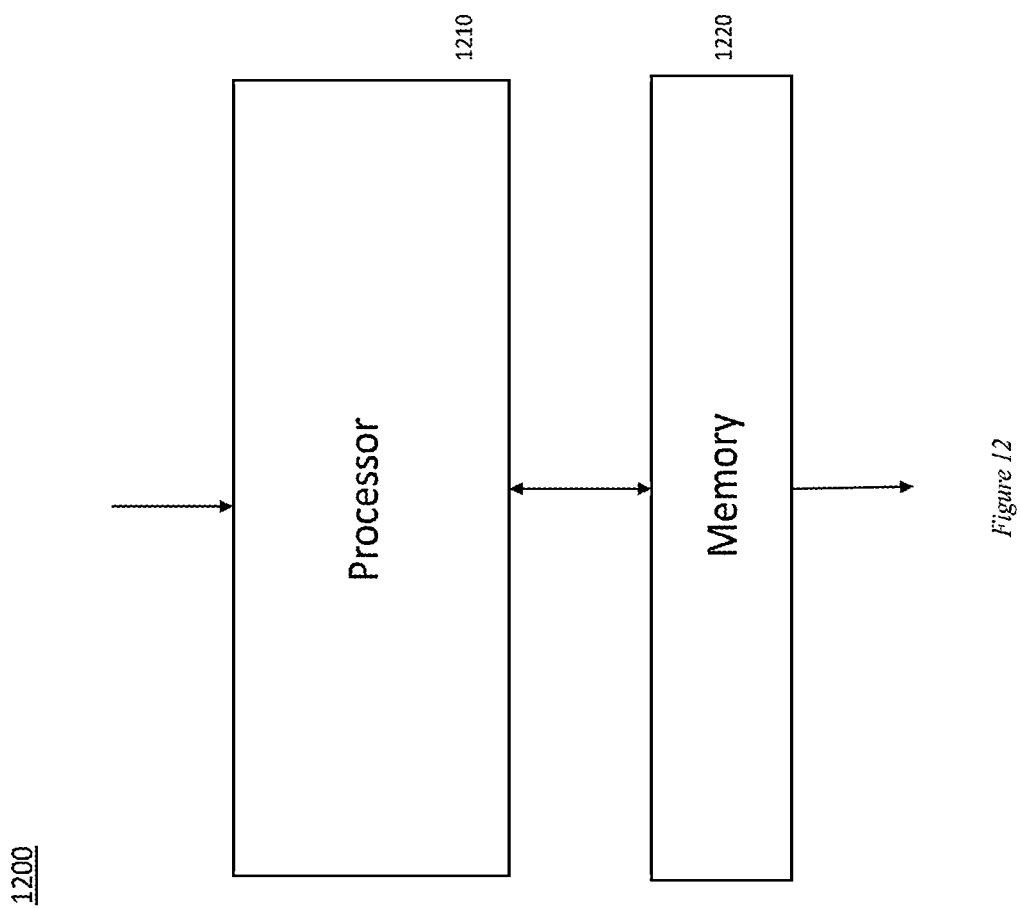
FIG. 12 shows an embodiment of an apparatus for encoding or decoding using in-loop filtering with multiple regions.

FIG. 12 shows one embodiment of an apparatus 1200 for encoding or decoding a block of video data. The apparatus comprises Processor 1210 and can be interconnected to a memory 1220 through at least one port. Both Processor 1210 and memory 1220 can also have one or more additional interconnections to external connections.

Processor 1210 is configured to either encode or decode video data by predicting a sample of a non-square video block using at least one of N reference samples from a row above the non-square video block or at least one of M reference samples from a column left of the non-square video block and, either encoding or decoding the non-square video block using the prediction in an intra coding mode.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 13:
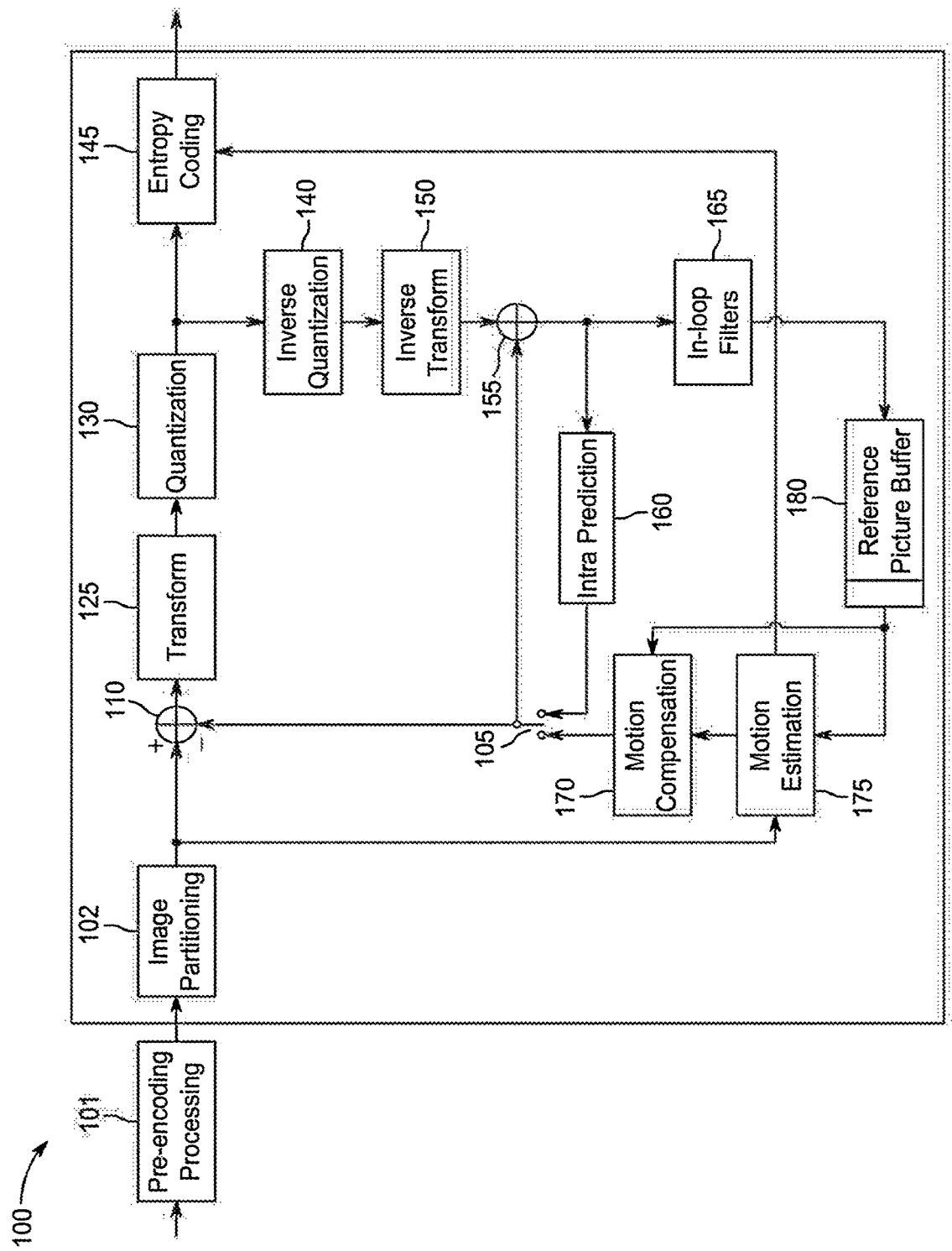
FIG. 13 shows a generic, standard encoding scheme.
Figure 14:
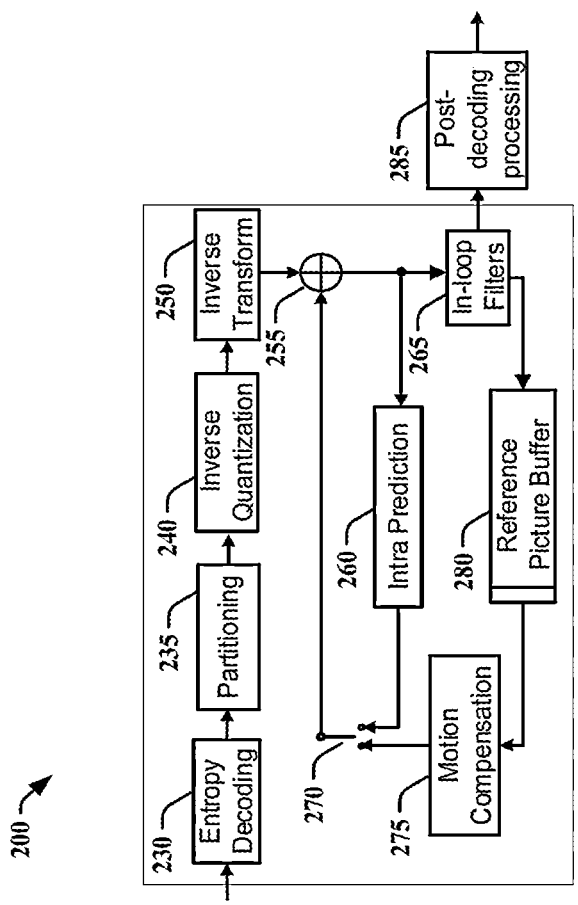
FIG. 14 shows a generic, standard decoding scheme.
Figure 15:
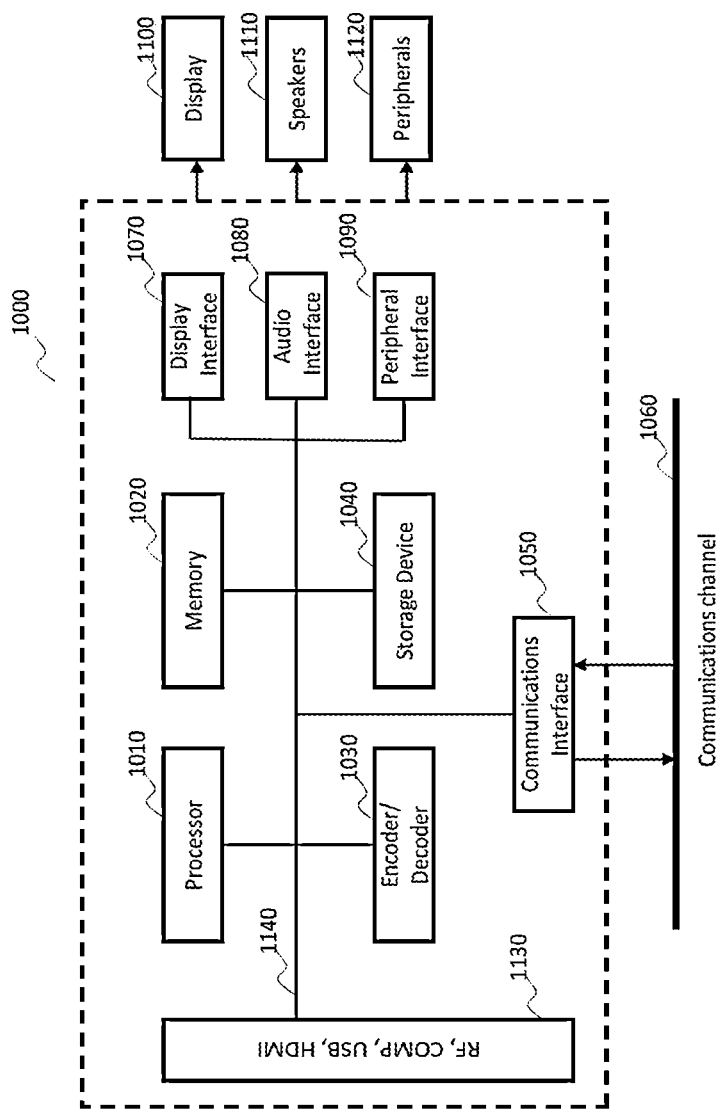
FIG. 15 shows a typical processor arrangement in which the described embodiments may be implemented.

The embodiments described and contemplated in this document can be implemented in many different forms. FIGS. 13, 14 and 15 below provide some embodiments, but other embodiments are contemplated and the discussion of FIGS. 13, 14 and 15 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 13 and FIG. 14. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1}}. The specific values are for example purposes and the aspects described are not limited to these specific values.

FIG. 13 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 14 illustrates a block diagram of a video decoder 200. In the decoder 200, a bitstream is decoded by the decoder elements as described below. Video decoder 200 generally performs a decoding pass reciprocal to the encoding pass as described in FIG. 13. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 15 illustrates a block diagram of an example of a system in which various embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various embodiments described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the 12C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

Embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding description has described a number of embodiments. These and further embodiments include the following optional features alone or in any combination, across various different claim categories and types:

Using prediction directions during intra prediction in encoding and decoding beyond −135 degrees and 45 degrees extending interactions between wide-angel modes and PDPC extending the prediction directions in a horizontal or vertical direction while removing some directions in the opposite direction to maintain the same number of total directions extending the number of directions both beyond −135 degrees and beyond 45 degrees combining PDPC and wide angle intra prediction to samples within a block signaling from an encoder to a decoder which prediction directions are being used using a subset of prediction directions the block is a CU having a rectangular shape the other block is a neighboring block A bitstream or signal that includes one or more of the described syntax elements, or variations thereof.

Inserting in the signaling syntax elements that enable the decoder to process a bitstream in an inverse manner as to that performed by an encoder.

Creating and/or transmitting and/or receiving and/or decoding a bitstream or signal that includes one or more of the described syntax elements, or variations thereof.

A TV, set-top box, cell phone, tablet, or other electronic device that performs any of the embodiments described.

A TV, set-top box, cell phone, tablet, or other electronic device that performs any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs any of the embodiments described.

A TV, set-top box, cell phone, tablet, or other electronic device that receives (e.g. using an antenna) a signal that includes an encoded image, and performs any of the embodiments described.

Various other generalized, as well as particularized, features are also supported and contemplated throughout this disclosure.

The invention claimed is:

1. A method, comprising:

predicting a sample of a non-square video block using at least one of N reference samples from a row above the non-square video block and at least one of M reference samples from a column left of the non-square video block, wherein said prediction comprises a weighted combination of said reference samples; and encoding the non-square video block using said prediction in an intra coding mode, wherein N and M are based on a dimension of the non-square video block such that N is equal to twice the width of the non-square video block plus one sample and M is equal to twice the height of the non-square block plus one sample and wherein said prediction comprises a weighted combination of said reference samples with a greater number of prediction directions along a longer dimension of said non-square video block than a number of prediction directions along a shorter dimension of said non-square video block and prediction directions along the longer dimension of the non-square video block able to extend to angles greater than 45 degrees and less than −135 degrees, as measured by an angle between a horizontal line and a line extending from a reference sample to a sample that is to be predicted in the non-square video block.

2. The method of claim 1, wherein intra prediction modes extend beyond angles of 45 and −135 degrees.

3. The method of claim 1, wherein said N reference samples extends beyond a right edge of said non-square block.

4. The method of claim 1, wherein said M reference samples extends beyond a bottom edge of said non-square block.

5. A non-transitory computer readable medium containing data content generated according to the method of claim 1, for playback using a processor.

6. A non-transitory signal comprising video data generated according to the method of claim 1, for playback using a processor.

7. An apparatus, comprising:
a processor, configured to:
predict a sample of a non-square video block using at least one of N reference samples from a row above the non-square video block and at least one of M reference samples from a column left of the non-square video block, wherein said prediction comprises a weighted combination of said reference samples; and,
encode the non-square video block using said prediction in an intra coding mode, wherein N and M are based on a dimension of the non-square video block such that N is equal to twice the width of the non-square video block plus one sample and M is equal to twice the height of the non-square block plus one sample and wherein said prediction comprises a weighted combination of said reference samples with a greater number of prediction directions along a longer dimension of said non-square video block than a number of prediction directions along a shorter dimension of said non-square video block and prediction directions along the longer dimension of the non-square video block able to extend to angles greater than 45 degrees and less than −135 degrees, as measured by an angle between a horizontal line and a line extending from a reference sample to a sample that is to be predicted in the non-square video block.

8. A method, comprising:
predicting a sample of a non-square video block using at least one of N reference samples from a row above the non-square video block and at least one of M reference samples from a column left of the non-square video block, wherein said prediction comprises a weighted combination of said reference samples; and,
decoding the non-square video block using said prediction in an intra coding mode, wherein N and M are based on a dimension of the non-square video block such that N is equal to twice the width of the non-square video block plus one sample and M is equal to twice the height of the non-square block plus one sample and wherein said prediction comprises a weighted combination of said reference samples with a greater number of prediction directions along a longer dimension of said non-square video block than a number of prediction directions along a shorter dimension of said non-square video block and prediction directions along the longer dimension of the non-square video block able to extend to angles greater than 45 degrees and less than −135 degrees, as measured by an angle between a horizontal line and a line extending from a reference sample to a sample that is to be predicted in the non-square video block.

9. A non-transitory computer program product comprising instructions which, when the program is executed by a computer, cause the computer to carry out the method of any one of claim 8.

10. The method of claim 8, wherein intra prediction modes extend beyond angles of 45 and −135 degrees.

11. The method of claim 8, wherein said N reference samples extends beyond a right edge of said non-square block.

12. The method of claim 8, wherein said M reference samples extends beyond a bottom edge of said non-square block.

13. An apparatus, comprising:
a processor, configured to:
predict a sample of a non-square video block using at least one of N reference samples from a row above the non-square video block and at least one of M reference samples from a column left of the non-square video block, wherein said prediction comprises a weighted combination of said reference samples; and,
decode the non-square video block using said prediction in an intra coding mode, wherein N and M are based on a dimension of the non-square video block such that N is equal to twice the width of the non-square video block plus one sample and M is equal to twice the height of the non-square block plus one sample and wherein said prediction comprises a weighted combination of said reference samples with a greater number of prediction directions along a longer dimension of said non-square video block than a number of prediction directions along a shorter dimension of said non-square video block and prediction directions along the longer dimension of the non-square video block able to extend to angles greater than 45 degrees and less than −135 degrees, as measured by an angle between a horizontal line and a line extending from a reference sample to a sample that is to be predicted in the non-square video block.

* * * * *